(12) United States Patent
Bratland

(10) Patent No.: US 10,415,121 B2
(45) Date of Patent: Sep. 17, 2019

(54) NICKEL ALLOY COMPOSITIONS FOR AGGRESSIVE ENVIRONMENTS

(71) Applicant: ONESUBSEA IP UK LIMITED, London (GB)

(72) Inventor: Paal Bratland, Nesttun (NO)

(73) Assignee: ONESUBSEA IP UK LIMITED, London (GB)

( * ) Notice: Subject to any disclaimer, the term of this patent is extended or adjusted under 35 U.S.C. 154(b) by 225 days.

(21) Appl. No.: 15/229,935

(22) Filed: Aug. 5, 2016

(65) Prior Publication Data

US 2018/0037979 A1 Feb. 8, 2018

(51) Int. Cl.

| | |
|---|---|
| *C22C 30/02* | (2006.01) |
| *C22C 19/05* | (2006.01) |
| *B22F 3/15* | (2006.01) |
| *B22F 3/105* | (2006.01) |
| *B33Y 10/00* | (2015.01) |
| *B33Y 80/00* | (2015.01) |
| *E21B 17/00* | (2006.01) |
| *C22C 1/04* | (2006.01) |
| *B33Y 70/00* | (2015.01) |
| *B22F 5/00* | (2006.01) |

(52) U.S. Cl.
CPC ............ *C22C 30/02* (2013.01); *B22F 3/1055* (2013.01); *B22F 3/15* (2013.01); *B33Y 10/00* (2014.12); *B33Y 70/00* (2014.12); *B33Y 80/00* (2014.12); *C22C 1/0433* (2013.01); *C22C 19/055* (2013.01); *C22C 19/056* (2013.01); *E21B 17/00* (2013.01); *B22F 2005/001* (2013.01); *B22F 2998/00* (2013.01); *Y02P 10/295* (2015.11)

(58) Field of Classification Search
CPC ....... C22C 19/03; C22C 19/05; C22C 19/055; C22C 19/051; C22C 19/056; E21B 17/00; B22F 3/15; B22F 3/1055; B33Y 10/00
See application file for complete search history.

(56) References Cited

U.S. PATENT DOCUMENTS

| | | | | |
|---|---|---|---|---|
| 3,890,816 | A * | 6/1975 | Allen | .................. C22C 32/0052 75/255 |
| 4,624,716 | A * | 11/1986 | Noel | ......................... C22F 1/10 148/410 |
| 5,470,371 | A * | 11/1995 | Darolia | ................. C22C 1/0433 148/410 |
| 8,637,166 | B2 * | 1/2014 | Ayer | ........................ B23K 9/23 219/121.13 |
| 2007/0144622 | A1 * | 6/2007 | Flahaut | ................. C22C 19/053 148/419 |
| 2007/0227630 | A1 * | 10/2007 | Augustins Lecallier | .................... C22C 1/0433 148/428 |
| 2013/0142661 | A1 | 6/2013 | Hardy | |

OTHER PUBLICATIONS

Bruce F. Antolovich, "Fatigue and Fracutre of Nickel-Base Superalloys", ASM Handbook, vol. 19, 1996, Metallurgical Research Consultants, Inc., pp. 2190-2228.
R. Terrence Webster, "Zirconium and Hafnium", ASM Handbook, vol. 2, Properties and Selection: Nonferrous Alloys and Special-Purpose Materials, pp. 1947-1965, (1990).
Paul E. Danielson et al., "Metallography and Microstructures of Zirconium, Hafnium, and Their Alloys", ASM Handbook, vol. 9: Metallography and Microstructures, pp. 942-958 (2004).

* cited by examiner

*Primary Examiner* — C Melissa Koslow
(74) *Attorney, Agent, or Firm* — Brandon S. Clark

(57) ABSTRACT

A nickel alloy composition comprising hafnium provides superior heat, corrosion, and stress resistance. Various nickel alloy compositions used in the oil and gas industry are improved for use by the addition of hafnium in suitable amounts. Hafnium increases the high temperature ductility by promoting the precipitation of randomly distributed MC carbides.

11 Claims, 2 Drawing Sheets

| | C | Cr | Ni | Fe | Mn | Mo | Si | Nb | Ti | Cu | Al | Co | N | B | P | S | Hf |
|---|---|---|---|---|---|---|---|---|---|---|---|---|---|---|---|---|---|
| 1 | ≤0.10 | 20.0-23.0 | Bal* | ≤5.0 | ≤0.5 | 8.0-10.0 | ≤0.50 | 3.15-4.15 | ≤0.40 | - | ≤0.40 | - | - | - | ≤0.015 | ≤0.015 | 0.1-1.0 |
| 2 | ≤0.03 | 19.0-22.0 | 59.0-63.0 | ≤Bal* | ≤0.20 | 7.0-9.5 | ≤0.20 | 2.75-4.00 | 1.00-1.60 | ≤0.23 | ≤0.35 | - | - | ≤0.006 | ≤0.015 | ≤0.015 | 0.1-1.0 |
| 3 | ≤0.025 | 19.5-22.5 | 42.0-46.0 | ≥22.0 | ≤1.00 | 2.50-3.50 | ≤0.35 | 0.08-0.50 | 1.90-2.40 | 1.50-3.00 | 0.10-0.50 | - | - | - | ≤0.020 | ≤0.003 | 0.1-1.0 |

Chemistries are in % mass fraction.
*Bal=Balance

FIG. 1

| | Conventionally Used Nickel Alloys in the Oil and Gas Industry | | | | | | | |
|---|---|---|---|---|---|---|---|---|
| | N07716 | N07718 | N07725 | N09925 | N09935 | N09945 | N06625 | Range |
| Ni | 59.0-63.0 | 50.0-55.0 | 55.0-59.0 | 42.0-46.0 | 35.0-38.0 | 45.0-55.0 | ≥58.0 | 35-75 |
| Cr | 19.0-22.0 | 17.0-21.0 | 19.0-22.5 | 19.5-22.5 | 19.5-22.0 | 19.5-23.0 | 20-23 | 17-23 |
| Fe | Balance | Balance | Balance | ≥22 | Balance | Balance | ≤5 | 0-39.5 |
| Nb | 2.75-4.00 | - | 2.75-4.00 | 0.08-0.5 | 0.20-1.00 | 2.50-4.50 | - | 0.08-4.5 |
| Nb+Ta | - | 4.87-5.20 | - | - | - | - | 3.15-4.15 | 0-5.2 |
| Mo | 7.00-9.50 | 2.80-3.30 | 7.00-9.50 | 2.50-3.50 | 3.00-5.00 | 3.00-4.00 | 8.0-10.0 | 2.5-10.0 |
| Ti | 1.00-1.60 | 0.80-1.15 | 1.00-1.70 | 1.90-2.40 | 1.80-2.50 | 0.50-2.50 | 0.4 | 0-2.5 |
| Al | ≤0.35 | 0.40-0.60 | ≤0.35 | 0.10-0.50 | ≤0.50 | 0.01-0.70 | 0.4 | 0-0.7 |
| C | ≤0.030 | ≤0.045 | ≤0.030 | ≤0.025 | ≤0.030 | 0.005-0.040 | 0.1 | 0-0.1 |
| Co | - | ≤1.00 | - | - | ≤1.00 | - | - | 0-1.0 |
| Mn | ≤0.20 | ≤0.35 | ≤0.35 | ≤1.00 | ≤1.00 | ≤1.00 | ≤0.5 | 0-1.0 |
| Si | ≤0.20 | ≤0.35 | ≤0.20 | ≤0.35 | ≤0.35 | ≤0.50 | ≤0.5 | 0-0.5 |
| P | ≤0.015 | ≤0.010 | ≤0.015 | ≤0.020 | ≤0.025 | ≤0.030 | 0.015 | 0-0.03 |
| S | ≤0.010 | ≤0.010 | ≤0.010 | ≤0.003 | ≤0.001 | ≤0.010 | 0.015 | 0-0.15 |
| Cu | ≤0.23 | ≤0.23 | - | 1.50-3.00 | 1.00-2.00 | 1.50-3.00 | - | 0-3.0 |
| W | - | - | - | - | ≤1.00 | - | - | 0-1.0 |
| Hf | - | - | - | - | - | - | - | - |
| Amount of Hf to Include with Conventionally Used Nickel Alloys in the Oil and Gas Industry | | | | | | | | 0.1-2.0 |

Chemistries are in % mass fraction.

Figure 2

NICKEL ALLOY COMPOSITIONS FOR AGGRESSIVE ENVIRONMENTS

FIELD

The disclosure relates generally to metal compositions. The disclosure relates specifically to metal compositions for use in aggressive environments.

BACKGROUND

It is challenging to obtain metal compositions suitable for use in aggressive environments in marine and subsea environments. Metal compositions for use in aggressive environments can be heat treated and quenched to improve their mechanical properties. In certain situations, the level of ductility of the metal composition at high temperature does not allow for heat treatment, such as hot isostatic pressing, to occur without the metal composition cracking during quenching. Ductility is a solid material's ability to deform under tensile stress.

Various nickel alloy compositions are utilized in the oil and gas industry as well as the aerospace industry. It is of significant importance that piping systems for use in the oil and gas industry maintain their integrity. Within marine or subsea applications, the salty environment makes the conditions even more challenging when identifying suitably resistant compositions. Carbon and stainless steel are actually susceptible to corrosion by saltwater. Nickel alloys might thus be used in these environments due to their corrosion resistance as well as their ability to operate at high temperature and high pressure.

It would be advantageous to have metal compositions capable of undergoing heat treatment, such as hot isostatic pressing, and quenching without cracking. Therefore, components formed from those metal compositions would be capable of withstanding aggressive environments.

SUMMARY

According to some embodiments of the disclosure, a nickel alloy is described for use in oil and gas applications comprising about 0.1-2.0% hafnium, wherein high temperature ductility of a powder metal product is improved in comparison to the nickel alloy without hafnium. In some embodiments, the nickel alloy comprises about 0.1-1.0% hafnium.

According to some embodiments, the nickel alloy includes nickel 35-75%; chromium 17-23%; iron 0-39.5%; niobium 0.08-4.5%; (or up to 5.2%; when also including tantalum as a mixture therewith); molybdenum 2.5-10.0%; titanium 0-2.5%; aluminum 0-0.7%; carbon 0-0.1%; cobalt 0-1.0%; manganese 0-1.0%; silicon 0-0.5%; phosphorus 0-0.03%; sulphur 0-0.15%; copper 0-3.0%; and tungsten 0-0.1%.

According to some embodiments of the disclosure, the nickel alloy including nickel 35-75%; chromium 17-23%; iron 0-39.5%; molybdenum 2.5-10.0%; titanium 0-2.5%; aluminum 0-0.7%; carbon 0-0.1%; manganese 0-1.0%; silicon 0-0.5%; phosphorus 0-0.03%; and sulphur 0-0.15%.

According to some embodiments, the nickel alloy includes chromium 20-23%; iron 5%; niobium 3.15-4.15%; molybdenum 8.0-10.0%; titanium 0.4%; aluminum 0.4%; carbon 0.10%; manganese 0.5%; silicon 0.50%; phosphorus 0.015%; and sulphur 0.015%, with the remaining percentage being nickel.

According to some embodiments, the nickel alloy includes nickel 59-63%; chromium 19-22%; niobium 2.75-4.0%; molybdenum 7.0-9.5%; titanium 1.0-1.6%; aluminum 0.35%; carbon 0.03%; manganese 0.20%; silicon 0.20%; boron 0.006%; phosphorus 0.015%; sulphur 0.015%; copper 0.23% and the remaining percentage being iron.

According to some embodiments, the nickel alloy includes nickel 42.0-46.0%; chromium 19.5-22.5%; iron greater than or equal to 22.0%; niobium 0.08-0.5%; molybdenum 2.5-3.5%; titanium 1.9-2.4%; aluminum 0.10-0.50%; carbon 0.025%; manganese 1.0%; silicon 0.35%; phosphorus 0.020%; sulphur 0.003%; and; copper 1.5-3.0%.

In some embodiments, MC carbides, such as transition metal (e.g. hafnium) carbides, are precipitated at the grain boundaries of the microstructure at a greater level than M6C.

In some embodiments, MC carbides, such as transition metal (e.g. hafnium) carbides, are precipitated at the grain boundaries of the microstructure at a greater level than M23C6.

In some embodiments, a component for use in a subsea environment is comprised of a nickel alloy composition comprising about 0.1-2.0% hafnium, wherein high temperature ductility of a powder metal product is improved in comparison to the nickel alloy without hafnium.

In some embodiments, a component for use in a subsea environment is comprised of a nickel alloy composition comprising about 0.1-1.0% hafnium, wherein high temperature ductility of a powder metal product is improved in comparison to the nickel alloy without hafnium.

In some embodiments, a component for use in a subsea environment is comprised of a nickel alloy composition comprising about 0.1-2.0% hafnium, wherein high temperature ductility of a powder metal product is improved in comparison to the nickel alloy without hafnium, and further includes nickel 35-75%; and may also include any of chromium 17-23%; iron 0-39.5%; molybdenum 2.5-10.0%; titanium 0-2.5%; aluminum 0-0.7%; carbon 0-0.1%; manganese 0-1.0%; silicon 0-0.5%; phosphorus 0-0.03%; and sulphur 0-0.15%.

According to some embodiments of the disclosure, a method of manufacturing a nickel alloy component for use in a subsea environment is described, wherein the hafnium percentage in the nickel alloy component is about 0.1-2.0% hafnium, comprising utilizing at least one method of preparation selected from the group consisting of powder metal hot isostatic pressing and 3D printing. In some embodiments, the hafnium percentage in the nickel alloy component is about 0.1-1.0%.

According to some embodiments of the disclosure, a method of utilizing a nickel alloy component in a subsea environment is described, wherein the hafnium percentage in the nickel alloy is about 0.1-2.0%, comprising preparing the nickel alloy component by at least one method selected from the group consisting of powder metal hot isostatic pressing and 3D printing; and utilizing the nickel alloy component in a subsea oil and gas application. In some embodiments, the nickel alloy component comprises 0.1-1.0% hafnium.

According to some embodiments of the disclosure, nickel alloy component includes nickel 35-75%; and may also include any one of chromium 17-23%; iron 0-39.5%; molybdenum 2.5-10.0%; titanium 0-2.5%; aluminum 0-0.7%; carbon 0-0.1%; manganese 0-1.0%; silicon 0-0.5%; phosphorus 0-0.03%; and sulphur 0-0.15%.

According to some embodiments, the nickel alloy component includes any one of chromium 20-23%; iron 5%; niobium 3.15-4.15%; molybdenum 8.0-10.0%; titanium 0.4%; aluminum 0.4%; carbon 0.10%; manganese 0.5%; silicon 0.50%; phosphorus 0.015%; and sulphur 0.015% with the remaining percentage being nickel.

In some embodiments, the nickel alloy component includes nickel 59-63%; chromium 19-22%; niobium 2.75-4.0%; molybdenum 7.0-9.5%; titanium 1.0-1.6%; aluminum 0.35%; carbon 0.03%; manganese 0.20%; silicon 0.20%; boron 0.006%; phosphorus 0.015%; sulphur 0.015%; and copper 0.23%, with the remaining percentage being iron.

In some embodiments, the nickel alloy component includes nickel 42.0-46.0%; chromium 19.5-22.5%; iron greater than or equal to 22.0%; niobium 0.08-0.5%; molybdenum 2.5-3.5%; titanium 1.9-2.4%; aluminum 0.10-0.50%; carbon 0.025%; manganese 1.0%; silicon 0.35%; phosphorus 0.020%; sulphur 0.003%; and copper 1.5-3.0%.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

FIG. 1 depicts a table of three nickel alloys formulated to improve high temperature ductility of powder metal products according to some embodiments; and FIG. 2 depicts a table of seven nickel alloys commonly used in the oil and gas industry and ranges of the elements in those nickel alloys.

DETAILED DESCRIPTION

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

As used herein, the term "ductility" means and refers to the ability of a solid material to deform under tensile stress.

Nickel alloys are oxidation and corrosion resistant materials that are suited for extreme environments. Nickel alloys have excellent mechanical strength and creep resistance. They perform well at high temperatures and have good surface stability. Nickel alloys are commonly used in the aviation and aerospace industries, as well as in springs and electrical components. Nickel alloys are also used in the oil and gas industry. Examples of nickel copper alloys contain nickel with copper and small amounts of iron and manganese. A known nickel copper alloy is the 400 grade (UNS N04400).

The powder metal hot isostatic pressing process subjects a composition to high temperature and isostatic gas pressure. Powder metal hot isostatic pressing (HIP) manufacturing can be used to prepare pressure-containing subsea oil and gas components. Hot isostatic pressing subjects a component to both elevated temperature and isostatic gas pressure in a high pressure containment vessel. A known pressurizing gas is argon. The steps of a HIP process might comprise powder blending, filling of the HIP can (usually at room temperature), air evacuation from the HIP can and HIPing (as may be conducted by simultaneously applying elevated temperature and high isostatic pressure). Coining can optionally be performed to obtain special properties. Coining is a form of stamping where the metal is put under stress high enough to induce plastic flow of the metal.

HIP enables reduction of the porosity of metals to provide a full density or near-full density product. HIP also enables a homogeneous phase distribution and a lack of preferential grain orientation. Following HIP, the thickness of a heavy wall nickel alloy component can have homogeneous properties throughout the structure. HIP treatment improves the mechanical properties of metal. The metal with improved mechanical properties therefore can be used in aggressive environments. In certain compositions, PM HIP nickel alloys exhibit low ductility at high temperatures. Deformation strain of the metal at high temperatures and during high temperature gradients can hinder the use of the heat treatment for HIPed items when exposed to heat treatments such as solution annealing, annealing followed by quenching used to arrive at a microstructure acceptable for oil and gas applications. Therefore, the resulting end product of the PM HIP nickel alloys has not been acceptable for oil field applications.

In embodiments of the disclosure, a controlled amount of hafnium is added to nickel alloy chemistries used in the oil and gas industry. In embodiments, the hafnium is added to nickel alloy chemistries specifically intended for powder metallurgical products. In embodiments, the products can be prepared by including, but not limited to, ingot melting, hot isostatic pressing, 3D metal printing, powder laser rapid sintering, gas atomization, plasma atomization, direct metal laser sintering (DMLS) process, or conventional processing. In embodiments, the products could be both PM HIP and 3D metal printed.

Hafnium is an element that is corrosion resistant. It is chemically similar and difficult to separate from zirconium. Hafnium forms a corrosion-inhibiting protective film by increasing the attachment of protective oxides on nickel alloys. Hafnium does not react with water or cold acids and is ductile. ASM Handbook, Vol. 2, Chapter 28 (1990); ASM Handbook, Vol. 9, Chapter 61 (2004).

The addition of hafnium to nickel alloys promotes the precipitation of randomly distributed transition metal carbides (MC carbides, such as hafnium caride). In a MC carbide, M represents one or more metallic atoms and C represents carbon. Carbides form during solidification of the nickel alloy. Carbides commonly found in nickel alloys include MC, $M_6C$, and $M_{23}C_6$. Randomly distributed MC carbides are precipitated at a greater level than $M_6C$ and $M_{23}C_6$. MC, $M_6C$, and $M_{23}C_6$ precipitate at the grain boundary with different morphologies. The morphologies can be determined using scanning electron microscopy. The precipitation of MC, $M_6C$, and $M_{23}C_6$ affects the properties of the nickel alloy. Precipitation of block-shaped carbides improves creep and rupture strength. $M_{23}C_6$ and $M_6C$ usually precipitate in a block shape. Exposure to high temperature for prolonged periods of time can cause formation of films along the grain boundaries that decrease ductility and rupture strength. Hafnium promotes precipitation of MC carbides, reducing the precipitation of $M_6C$ and $M_{23}C_6$ on the grain boundaries. The addition of hafnium promotes the precipitation of MC carbides more than other the addition of other metals. There is a difference in the microstructure after powder metal hot isostatic processing of a nickel alloy with and without hafnium.

In embodiments of the disclosure, the presence of hafnium increases the high temperature ductility of the powder metal nickel alloy compositions and enables satisfactory high temperature performance of components manufactured using the powder metal alloy compositions. In embodiments, the hafnium-containing nickel alloy is able to withstand a temperature of 300° C. The hafnium also facilitates heat treatment performance, such as HIPing, by allowing the use of rapid cooling after heat treatment such as a water quench. Rapid cooling of the hafnium nickel alloy can be performed without problems, such as cracking, occurring due to ductility.

FIG. 1 depicts three compositions of nickel alloys according to embodiments of the disclosure that enable improving high temperature ductility of powder metal products or components for incorporation into subsea oil and gas parts by adding a controlled amount of hafnium to reduce the amount of $M_6C$ and $M_{23}C_6$ precipitation at the grain boundary, for example, reducing the amount of hafnium carbide thereat.

FIG. 2 provides seven nickel alloys commonly used in the oil and gas industry and ranges of each element that can be utilized to prepare such nickel alloys. Hafnium can be added in controlled amounts to these nickel alloys to reduce the amount of $M_6C$ and $M_{23}C_6$ precipitation at the grain boundary, for example, reducing the amount of hafnium carbide thereat. In embodiments, hafnium can be added to various conventional alloys. In embodiments of the disclosure, the various conventional alloys can be selected by utilizing the API 6ACRA standard. In embodiments, the elements present in the various nickel alloys can be present at about the percentages listed. In embodiments, the nickel alloys, with hafnium included, can be used in the refining industry, chemical industry, and power generation industry, including radioactive waste handling. FIG. 2 refers to various alloys by the unified numbering system. Numbers in the following format, Nxxxxx, represent nickel and nickel alloys.

In embodiments, the range of hafnium in a nickel alloy will be 0.1-2.0%. In other embodiments, the range of hafnium present in a nickel alloy will be 0.1-1.0%. In embodiments, hafnium can be added to any nickel alloy that provides suitable properties for the application.

In embodiments, the compositions have benefits in terms of resistance to environmental cracking of alloys manufactured by conventional ingot based methods such as forgings, forged bars, wrought fittings and plates through the modification to the precipitation of the randomly distributed transition metal carbides within alloys resulting from the hafnium addition.

In embodiments, hafnium can be added to any nickel alloy suitable for use in an aggressive environment. An aggressive environment can include but is not limited to, high temperature, high salinity, high $H_2S$ concentrations, low pH, the presence of atomic hydrogen, and high pressure. In embodiments, the hafnium-containing nickel alloy will be used in the oil and gas industry. In embodiments, the hafnium-containing nickel alloy will be exposed to a salt water environment. In embodiments, the hafnium-containing nickel alloy will be used underwater and could be subjected to cathodic protection generating atomic hydrogen. In embodiments, the hafnium-containing nickel alloy is able to withstand a temperature of about 300° C., pressure of about 1406 kilograms per square centimeter (138 MPa), and a salinity of about 260,000 parts per million. In an embodiment, the salinity can be up to 260,000 mg/l of chloride. In embodiments, the hafnium-containing nickel alloy might be used for load bearing components. In embodiments, hot corrosion resistance and dwell crack resistance protocols known in the art can be used to evaluate the properties of the various hafnium-containing nickel alloys disclosed herein.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A subsea oil and gas applications part comprising a nickel alloy component, the alloy component comprising about 0.1-2.0% hafnium for enhanced high temperature ductility and is prepared by one of powder metal hot isostatic pressing and 3D printing.

2. The subsea oil and gas applications part of claim 1, wherein the nickel alloy comprises about 0.1-1.0% hafnium.

3. The subsea oil and gas applications part of claim 1, wherein the nickel alloy component further comprises at least one of nickel 35-75%; chromium 17-23%; iron 0-39.5%; niobium 0.08-4.5%; niobium+tantalum 0-5.2%; molybdenum 2.5-10.0%; titanium 0-2.5%; aluminum 0-0.7%; carbon 0-0.1%; cobalt 0-1.0%; manganese 0-1.0%; silicon 0-0.5%; phosphorus 0-0.03%; sulphur 0-0.15%; copper 0-3.0%; and tungsten 0-0.1%.

4. The subsea oil and gas applications part of claim 2, wherein the nickel alloy comprises at least one of chromium 20-23%; iron 5%; niobium 3.15-4.15%; molybdenum 8.0-10.0%; titanium 0.4%; aluminum 0.4%; carbon 0.10%; manganese 0.5%; silicon 0.50%; phosphorus 0.015%; and sulphur 0.015%.

5. The subsea oil and gas applications part of claim 1, wherein transition metal (M) carbides (C) (MC) are precipitated at the grain boundaries of the microstructure at a greater level than $M_6C$ of the nickel alloy.

6. The subsea oil and gas applications part of claim 1, wherein transition metal (M) carbides (C) (MC) are precipitated at the grain boundaries of the microstructure at a greater level than $M_{23}C_6$ of the nickel alloy.

7. A method comprising:
manufacturing a nickel alloy component, wherein a hafnium percentage in the nickel alloy component is about 0.1-2.0% hafnium, the manufacturing comprising utilizing at least one method of preparation selected from the group consisting of powder metal hot isostatic pressing and 3D printing; and
utilizing the component in a subsea environment as a component of a subsea oil and gas application part.

8. The method of claim 7, wherein the hafnium percentage in the nickel alloy component is about 0.1-1.0%.

9. A method of utilizing a nickel alloy component in a subsea environment, wherein the hafnium percentage in the nickel alloy is about 0.1-2.0%, the method comprising:
preparing the nickel alloy component by at least one method selected from the group consisting of powder metal hot isostatic pressing and 3D printing; and
incorporating the nickel alloy component into a subsea oil and gas part.

10. The method of claim 9 wherein the nickel alloy component comprises 0.1-1.0% hafnium.

11. The method of claim 9 wherein the nickel alloy component further comprises at least one of nickel 35-75%; chromium 17-23%; iron 0-39.5%; molybdenum 2.5-10.0%; titanium 0-2.5%; aluminum 0-0.7%; carbon 0-0.1%; manganese 0-1.0%; silicon 0-0.5%; phosphorus 0-0.03%; and sulphur 0-0.15%.

* * * * *